Patented Nov. 1, 1949

2,486,379

UNITED STATES PATENT OFFICE 2,486,379

MANUFACTURE OF NUCLEAR HALOGENATED ALKENYL-BENZENE COMPOUNDS

James L. Amos, Midland, and Frederick J. Soderquist, Bay City, Mich., assignors to The Dow Chemical Company, Midland, Mich., a corporation of Delaware No Drawing. Application July 22, 1946, Serial No. 685,374

4 Claims. (Cl. 260—650)

This invention pertains to the production of nuclear halogenated alkenyl-benzene compounds, particularly monochlorostyrene, i. e. ar-chlorovinylbenzene.

It is known that vinyl aromatic compounds may be formed by the pyrolysis of alkyl-benzene compounds having from 2 to 3 carbon atoms in an alkyl radical thereof and that such reaction may be accomplished by passing a vapor mixture of steam and the alkyl-benzene compound over a dehydrogenation catalyst a a reaction temperature, usually in the order of from 500° to 750° C. This known method has been applied in producing styrene from ethylbenzene and in forming nuclear chlorinated styrene from ethylchlorobenzene, etc. The reaction occurs smoothly and without serious operating difficulties when the alkyl-benzene reactant is a hydrocarbon, e. g. ethylbenzene.

However, in our copending application, Serial No. 658,510, filed March 30, 1946, of which this application is a continuation-in-part, we show that serious operating difficulties are usually encountered when attempt is made to produce a nuclear halogenated alkenyl-benzene compound by the known method just mentioned. For instance, many of the metal oxide dehydrogenation catalysts that are satisfactory for the dehydrogenation of ethylbenzene, rapidly become poisoned and lose their activity when employed for the dehydrogenation of ethyl-chlorobenzene to form chlorostyrene. Also, during such dehydrogenation of a nuclear chlorinated ethylbenzene in the presence of steam and a catalyst, a portion of the reactant becomes hydrolyzed with formation of phenolic by-products and hydrochloric acid. The phenolic by-products tend to cause emulsification of the water and aromatic products upon condensation of the reaction vapors and thereby interfere with separation of the products. The hydrochloric acid causes corrosion of ordinary iron and steel apparatus such as plates of the condenser for cooling the vapors. Peculiarly, it causes little or no corrosion of metal walls of a pyrolysis chamber, i. e. the corrosive action apparently occurs during or after condensation of the products. Also, a portion of the hydrochloric acid reacts with the chlorostyrene product to form an unstable derivative, presumably alpha - chloroethyl - chlorobenzene, which tends to decompose and liberate hydrogen chloride during subsequent distillation of the products. The presence of even a small proportion of hydrogen halide, e. g. an amount corresponding to less than 0.2 per cent of the weight of the organic components of the reaction mixture, is sufficient to cause serious operating difficulties in the respects just stated.

In our aforementioned copending application, Serial No. 658,510, we have disclosed that by-product formation during the pyrolysis of an alkyl-halobenzene in the presence of steam may be minimized and many of such operating difficulties avoided by employing activated alumina, particularly a precarbonized activated alumina, as a catalyst for the reaction. However, even when using such catalyst, a hydrogen halide is formed in amount sufficient to cause corrosion of an iron or steel cooling unit and to interfere seriously with subsequent separation or purification of the alkenyl halobenzene product by distillation.

We have now found that the operating difficulties resulting from the presence of hydrogen halide in the reaction vapors may be avoided by injecting a vaporizable strongly basic nitrogen compound, e. g. ammonia or an aliphatic amine such as dimethylamine, ethylamine, or diethylamine, of basicity as great as that of ammonia, into the reaction vapors as they flow from the reaction zone and prior to cooling the same to condense the alkenyl-halobenzene product. The basic nitrogen compound is preferably added in vapor form, but it may be added in liquid form or as an aqueous solution thereof. It is added in amount as great as, or exceeding, the chemical equivalent of the hydrogen halide in the reaction vapors. Usually from 1 to 3 moles of the basic nitrogen compound is added per mole of the hydrogen halide, but the nitrogen compound may be used in greater proportion if desired.

In producing an alkenyl-halobenzene in accordance with the invention, a vapor mixture of one part by volume of an alkyl halobenzene, e. g. ethyl-chlorobenzene, diethyl-chlorobenzene, isopropyl-chlorobenzene, isopropyl-dichlorobenzene, di-isopropyl-chlorobenzene, ethyl-bromobenzene, or propyl-bromobenzene, etc., and one part or more, usually from 1 to 4 parts, of steam is passed through a reaction zone containing a granular dehydrogenation catalyst. As the catalyst, activated alumina (the preparation of which is described in U. S. Patent 2,182,431), and particularly activated alumina which has been precarbonized by treatment with a hydrocarbon vapor at temperatures between 600° C. and 700° C., is preferred, but other catalysts, e. g. activated charcoal, kaolin, or difficultly reducible metal oxides such as ordinary aluminum oxide, or thorium oxide, etc., can be used. Prior to, or during, flow over the catalyst, the vapors are heated to a reaction temperature which usually is in the order of from 550° C. to 700° C., although lower or higher temperatures can be used.

The vapors flow from the reaction zone to a cooling unit, e. g. a condenser or heat exchanger, where they are cooled sufficiently to condense the aromatic products and preferably also the steam. However, prior to such extensive cooling of the vapors, a basic nitrogen compound, preferably gaseous ammonia or an aqueous ammonium hydroxide solution, is injected into the mixture in amount sufficient to neutralize all hydrogen halide formed during the pyrolysis or otherwise present in the vapor mixture. The ammonia, or other basic nitrogen compound, is effective in neutralizing the hydrogen halide so as substantially to avoid corrosion of the apparatus or reaction with the halo-alkenylbenzene product. In this respect it may be mentioned that the discovery that corrosion may be avoided by such injection of a basic nitrogen compound into the reaction vapors was somewhat surprising inasmuch as ammonium halides are usually regarded as highly corrosive to metals, particularly at elevated temperatures.

After cooling and condensation of the products, the aqueous and organic layers of the condensate are separated. The alkenyl halobenzene product is separated from the organic layer in usual ways, preferably by fractional distillation under vacuum in the presence of a minor amount, e. g. 1 per cent by weight or less, of an added polymerization inhibitor. A variety of inhibitors suitable for the purpose are known to the art.

The following examples describe certain ways in which the principle of the invention has been applied, but are not to be construed as limiting its scope.

*Example 1*

A vapor mixture of 1 part by weight of ethylchlorobenzene and 3.1 parts of steam was passed, at a temperature of about 700° C. and a rate corresponding to 153 grams of ethylchlorobenzene per hour, into a reaction chamber filled with a 700 cubic centimeter bed of granular activated alumina which had been precarbonized by an earlier treatment at similar temperatures with vapors of isopropylbenzene. Vapors flowing from the reaction zone were cooled in a steel cooling unit to condense the steam and aromatic products. The aqueous and organic phases of the condensate were separated. The aqueous phase contained a detectable amount of dissolved iron salts, indicating that corrosion of the apparatus had occurred. The organic phase was analyzed. It contained approximately 40 per cent by weight of monochlorostyrene and 1.14 per cent of a side-chain chlorinated ethylchlorobenzene which is presumed to be alpha-chloroethyl-chlorobenzene. On attempt to separate the monochlorostyrene by fractional distillation of the organic phase under vacuum and in the presence of a minor amount of a polymerization inhibitor, e. g. 0.1 per cent by weight of tertiary-butyl catechol, hydrogen chloride is formed, presumably by decomposition of the alpha-chloroethyl-chlorobenzene, and a considerable amount of tarry polymeric material is formed.

*Example 2*

The procedure of Example 1 was repeated using the same bed of catalyst, except that gaseous ammonia, at a rate corresponding to from 3 to 4 per cent on a weight basis of the rate of feed of the ethylchlorobenzene, was injected in the reacted vapors flowing from the reaction zone to the condenser. The organic phase of the condensed reaction mixture contained 35 per cent by weight of chlorostyrene and only 0.29 per cent of alpha-chloroethyl-chlorobenzene. No corrosion of the steel apparatus was observed.

*Example 3*

A vapor mixture of 1 part by weight of ethylchlorobenzene and 2.4 parts of steam was passed at temperatures of from 640° C. to 670° C., and a rate corresponding to 211 grams of the ethylchlorobenzene per hour, into a 700 cubic centimeter bed of granular, precarbonized, activated alumina. Gaseous ammonia was injected, at a rate corresponding to from 3 to 4 per cent on a weight basis of the rate of feed of the ethylchlorobenzene, into the vapor mixture flowing from the bed. The vapors were thereafter cooled, by flow into a steel cooling unit, to condense the products and the aqueous and organic layers of the condensate were separated. No corrosion of apparatus was observed. The organic layer of the condensate contained 40 per cent by weight of chlorostyrene and was free of side-chain chlorinated ethylchlorobenzene. The organic layer may be fractionally distilled, under vacuum and in the presence of a minor amount of an added polymerization inhibitor, to separate and purify the chlorostyrene without occurrence of more than a minor and practically inconsequential amount of polymerization.

The method, as herein described and illustrated in the foregoing specific examples, may be applied with advantage in producing other nuclear halogenated vinyl aromatic compounds by the pyrolysis of corresponding alkyl haloaromatic compounds in the presence of steam and a dehydrogenation catalyst. For instance, it may be applied in producing bromostyrene from ethyl-bromobenzene; in producing alpha-methyl-chlorostyrene from isopropyl-chlorobenzene; in producing alpha-methyl-3,4-dichlorostyrene from 1-isopropyl-3,4-dichlorobenzene; and in producing a dichlorostyrene from an ethyl-dichlorobenzene; etc.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method for the production of a nuclear halogenated alkenylbenzene compound wherein an alkyl-halobenzene having from 2 to 3 carbon atoms in an alkyl radical is passed at a reaction temperature between 500° and 750° C. over a dehydrogenation catalyst, whereby an ar-halo-alkenylbenzene compound is formed together with a minor amount of a hydrogen halide, the step of injecting, into the vapor mixture flowing from the catalyst, a vaporizable basic nitrogen compound of basicity as great as that of ammonia, the basic nitrogen compound being added in amount at least as great as the chemical equivalent of the hydrogen halide present in the reaction vapors and cooling the resultant vapor mixture, while in contact with surfaces of a ferrous metal, to condense the ar-halo-alkenylbenzene compound.

2. In a method for the production of a nuclear halogenated alkenylbenzene compound wherein an alkyl-halobenzene having from 2 to 3 carbon atoms in an alkyl radical is passed together with at least an equal weight of steam over a dehydrogenation catalyst at a reaction temperature between 500° and 750° C., and an ar-halo-alkenylbenzene compound is thereby formed together with a minor amount of a hydrogen halide, the step of injecting, into the vapor mixture flowing from the catalyst, ammonia in amount at least as great as the chemical equivalent of the hydrogen halide present in the reaction vapors, cooling the resultant vapor mixture, by passing the same into contact with cooler surfaces of a ferrous metal, to condense the ar-halo-alkenylbenzene compound.

3. In a method for the production of a nuclear chlorinated styrene wherein an alkyl chlorobenzene having from 2 to 3 carbon atoms in an alkyl radical is passed together with at least an equal weight of steam over a dehydrogenation catalyst composed principally of activated alumina at a reaction temperature between 500° and 750° C., and a nuclear chlorinated styrene is thereby formed together with a minor amount of hydrogen chloride, the steps of injecting, into the vapor mixture flowing from the catalyst, ammonia in amount at least as great as the chemical equivalent of the hydrogen chloride present in the reaction vapors, thereafter cooling the vapors, by contacting the same with cooler surfaces of a ferrous metal, to condense the aromatic products and separating the nuclear chlorinated styrene from the organic phase of the condensate.

4. In a method for the production of monochlorostyrene wherein a vapor mixture of ar-chloro-ethylbenzene and at least an equal weight of steam is passed at a reaction temperature between 500° and 750° C. over a dehydrogenation catalyst composed principally of activated alumina, and ar-chlorostyrene is thereby formed together with a minor amount of hydrogen chloride, the steps of injecting, into the vapor mixture flowing from the catalyst, ammonia in amount at least as great as the chemical equivalent of the hydrogen chloride present in the reaction vapors, thereafter cooling the vapors by contacting the same with cooler surfaces of a ferrous metal, to condense the aromatic products and separating the chlorostyrene by fractional distillation of the aromatic products at subatmospheric pressure and in the presence of a minor amount of an added polymerization inhibitor.

JAMES L. AMOS.
FREDERICK J. SODERQUIST.

REFERENCES CITED

The following references are of record in the file of this patent:

UNITED STATES PATENTS

| Number | Name | Date |
|---|---|---|
| 1,715,095 | Morrell et al. | May 28, 1929 |
| 1,844,475 | Morrell et al. | Feb. 9, 1932 |
| 1,970,143 | Kimball | Aug. 14, 1934 |
| 2,110,829 | Dreisbach | Mar. 8, 1938 |
| 2,231,026 | Quattlebaum et al. | Feb. 11, 1941 |